US012684626B2

(12) United States Patent
Yue et al.

(10) Patent No.: US 12,684,626 B2
(45) Date of Patent: Jul. 14, 2026

(54) METHOD AND APPARATUS FOR SMALL DATA TRANSMISSION

(71) Applicant: Lenovo (Beijing) Limited, Beijing (CN)

(72) Inventors: Ran Yue, Beijing (CN); Haiming Wang, Beijing (CN); Jie Shi, Beijing (CN); Lianhai Wu, Beijing (CN); Min Xu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 320 days.

(21) Appl. No.: 18/251,083

(22) PCT Filed: Nov. 25, 2020

(86) PCT No.: PCT/CN2020/131504
§ 371 (c)(1),
(2) Date: Apr. 28, 2023

(87) PCT Pub. No.: WO2022/109877
PCT Pub. Date: Jun. 2, 2022

(65) Prior Publication Data
US 2023/0413345 A1      Dec. 21, 2023

(51) Int. Cl.
*H04W 72/10*      (2009.01)
*H04W 74/08*      (2009.01)

(52) U.S. Cl.
CPC ............................... *H04W 74/0875* (2013.01)

(58) Field of Classification Search
None
See application file for complete search history.

(56) References Cited

U.S. PATENT DOCUMENTS

| | | | | |
|---|---|---|---|---|
| 2017/0251516 A1* | 8/2017 | Bangolae | .............. | H04W 76/22 |
| 2020/0059969 A1 | 2/2020 | Agiwal | | |
| 2020/0112971 A1* | 4/2020 | Kunt | ..................... | H04W 72/23 |
| 2020/0314895 A1* | 10/2020 | Bergström | ........ | H04W 28/0268 |
| 2022/0272758 A1* | 8/2022 | Agiwal | ............. | H04W 74/0833 |

FOREIGN PATENT DOCUMENTS

| | | |
|---|---|---|
| CN | 108781465 A | 11/2018 |
| CN | 111492688 A | 8/2020 |
| CN | 111972401 A | 11/2020 |
| EP | 3434061 B1 | 3/2017 |
| WO | 2020063061 A1 | 4/2020 |

OTHER PUBLICATIONS 20962768.6 , "European Search Report", Application No. 20962768. 6, Jul. 15, 2024, 9 pages.

(Continued)

*Primary Examiner* — Anez C Ebrahim
(74) *Attorney, Agent, or Firm* — FIG. 1 Patents

(57)      ABSTRACT

Embodiments of the present application are directed to a method and apparatus for small data transmission. In an embodiment of the present application, the method includes: selecting a channel access priority class (CAPC) for small data transmission (SDT) based on a rule if the CAPC for SDT is not indicated by a base station; and performing SDT based on the CAPC for the SDT.

20 Claims, 5 Drawing Sheets

(56)  References Cited

OTHER PUBLICATIONS

Nokia (Rapporteur) , "Offline 504 on NR-U in 38.300", 3GPP TSG-RAN WG2 Meeting #111 Electronic R2-2008475, Aug. 28, 2020, 7 pages.

Intel , "CAPC selection for UL transmissions", 3GPP TSG RAN WG2 #109e, R2-2001094, E-Meeting [retrieved May 10, 2023]. Retrieved from the Internet <https://www.3gpp.org/ftp/tsg_ran/WG2_RL2/TSGR2_109_e/Docs?sortby=date>., Feb. 2020, 3 Pages.

PCT/CN2020/131504 , "International Preliminary Report on Patentability", PCT Application No. PCT/CN2020/131504, Jun. 8, 2023, 5 pages.

PCT/CN2020/131504 , "International Search Report and Written Opinion", PCT Application No. PCT/CN2020/131504, Jul. 5, 2021, 6 pages.

Zte , et al., "Clarification on the CAPC selection for MSG3 and MSGA PUSCH", 3GPP TSG-RAN WG2 Meeting #111 electronic, R2-2007450, Online [retrieved May 10, 2023]. Retrieved from the Internet <https://www.3gpp.org/ftp/TSG_RAN/WG2_RL2/TSGR2_111-e/Docs/?sortby=size>., Aug. 2020, 2 Pages.

Zte , et al., "Selection between RRC-based and RRC-less solutions for IDT", 3GPP TSG-RAN2#111e, R2-2007448 [retrieved May 10, 2023]. Retrieved from the Internet <https://www.3gpp.org/ftp/tsg_ran/WG2_RL2/TSGR2_111-e/Docs>., Aug. 2020, 13 Pages.

Foreign Office Action issued in CN 202080107439.8, mailed May 23, 2026, 9 pages.

Nokia (Rapporteur), "Offline 504 on NR-U in 38.300", 3GPP TSG-RAN WG2 Meeting #111, R2-20xxxxx, Aug. 17, 2020, 7 pages.

* cited by examiner

METHOD AND APPARATUS FOR SMALL DATA TRANSMISSION

TECHNICAL FIELD

Embodiments of the present application generally relate to wireless communication technology, especially to a method and apparatus for small data transmission (SDT), e.g., for 5G new radio on an unlicensed spectrum (NR-U) uplink transmission.

BACKGROUND

A base station (BS) and a user equipment (UE) may operate in both licensed and unlicensed spectrums. For all transmissions including uplink (UL) and downlink (DL) transmissions on an unlicensed spectrum, a channel access priority class (CAPC) may be used by considering fairness between different traffic types and transmissions.

Listen before talk (LBT) is a channel access technique used for transmission on an unlicensed spectrum. For transmission on unlicensed spectrum, in order to achieve fair coexistence with other wireless systems, a LBT procedure is required to be performed before a transmitter (e.g., a BS or a UE) can start a transmission on an unlicensed spectrum. LBT is executed based on performing energy detection on a certain channel. Only when a LBT procedure generates a success result can the transmitter start transmission on the channel and occupy the channel up to a certain channel occupancy time; otherwise, the transmitter cannot start the transmission and continue performing LBT until a LBT procedure generates a successful result. In new radio (NR), there are two types of LBT, i.e., type 1 LBT and type 2 LBT. For type 1 LBT, a CAPC will be used when performing LBT. For type 2 LBT, a CAPC will not be used when performing LBT.

Small data transmission (SDT) may be performed when a UE is in a radio resource control (RRC)_INACTIVE state or in an idle state. However, there is no discussion on a mechanism for selecting a CAPC when SDT is performed.

SUMMARY OF THE APPLICATION

Embodiments of the present application provide a method and apparatus for data transmission, e.g., for 5G new radio on a NR-U uplink transmission.

An embodiment of the present application provides a method performed by a user equipment (UE). The method may include: selecting a channel access priority class (CAPC) to be used for small data transmission (SDT) based on a rule if the CAPC for SDT is not indicated by a base station; and performing SDT based on the CAPC for SDT.

In an embodiment of the present application, the method may further include: receiving information of the CAPC for SDT by a system broadcast message or radio resource control (RRC) signaling or predefining the CAPC for SDT.

In an embodiment of the present application, the method may further include: receiving the information of the CAPC for SDT in a configuration message of the SDT.

In an embodiment of the present application, selecting the CAPC to be used for SDT based on the rule comprises: selecting the CAPC for SDT to be used when performing the SDT.

In an embodiment of the present application, the information of the CAPC for SDT is used for: at least one of signaling radio bearer (SRB)0, SRB1, and SRB3; assistant information for SDT and at least one of SRB0, SRB1, and SRB3; logical channel including assistant information for SDT; an entire SDT message; data part of SDT or each dedicated traffic channel (DTCH) logical channel; each logical channel; medium access control (MAC) control element (CE); or data radio bearer (DRB).

In an embodiment of the present application, selecting the CAPC to be used for SDT based on a rule comprises: selecting at least one of the following CAPCs to be used for the SDT: highest or lowest priority CAPC of a common control channel (CCCH)(s) if a CCCH and/or dedicated control channel (DCCH) service data unit (SDU)(s) is included for SDT; lowest priority CAPC of the logical channel(s) with MAC SDU multiplexed in this MAC protocol data unit (PDU) for SDT; lowest priority CAPC of the DTCH logical channel(s) with MAC SDU multiplexed in this MAC PDU for SDT; highest priority CAPC if only MAC CE(s) for SDT are included; highest priority CAPC if MAC CE(s) for SDT are included; highest or lowest priority CAPC of a CCCH(s) and/or DCCH(s) and the logical channel(s) with MAC SDU multiplexed in this MAC PDU for SDT; highest or lowest priority CAPC of a CCCH(s) and/or DCCH(s) and MAC CE(s) and the logical channel(s) with MAC SDU multiplexed in this MAC PDU for SDT; highest or lowest priority CAPC of a CCCH(s) and/or DCCH(s) and the DTCH logical channel(s) with MAC SDU multiplexed in this MAC PDU for SDT; highest or lowest priority CAPC of a CCCH(s) and/or DCCH(s) and MAC CE(s) and the DTCH logical channel(s) with MAC SDU multiplexed in this MAC PDU for SDT; highest or lowest priority CAPC of all the parts which are multiplexed in this MAC PDU for SDT; highest or lowest priority; highest or lowest priority CAPC of a CCCH(s) and MAC CE(s) multiplexed in this MAC PDU for SDT; highest or lowest priority if CCCH SDU(s) carrying SRB0 is included for SDT; highest or lowest priority CAPC of MAC CE(s) and the logical channel(s) with MAC SDU multiplexed in this MAC PDU for SDT; and highest or lowest priority CAPC of MAC CE(s) and the DTCH logical channel(s) with MAC SDU multiplexed in this MAC PDU for SDT.

In an embodiment of the present application, the method may further include: re-assembling the MAC PDU including only a highest priority CAPC part in a previous MAC PDU if a consistent listen before talk (LBT) failure for SDT is triggered.

In an embodiment of the present application, the method is performed during RRC based SDT or RRC-less SDT.

In an embodiment of the present application, if the rule is not configured for the RRC-less SDT, a same CAPC for SDT with RRC based SDT is selected by assuming a certain RRC message is included as RRC based SDT.

Another embodiment of the present application provides a method performed by a base station (BS). The method may include: receiving uplink (UL) small data transmission (SDT) from a user equipment (UE); and selecting a channel access priority class (CAPC) to be used for downlink (DL) SDT based on a rule.

In an embodiment of the present application, the method may further include: transmitting information of the CAPC for SDT by a system broadcast message or radio resource control (RRC) signaling.

In an embodiment of the present application, the method may further include: transmitting the information of the CAPC for SDT in a configuration message of the SDT.

In an embodiment of the present application, the information of the CAPC for SDT is used for: at least one of SRB0, SRB1, and SRB3; assistant information for SDT and at least one of SRB0, SRB1, and SRB3; logical channel including assistant information for SDT; an entire SDT message; data part of SDT or each DTCH logical channel; each logical channel; MAC CE; or DRB.

In an embodiment of the present application, selecting the CAPC to be used for the DL SDT based on the rule comprises: use an equivalent priority CAPC with the received UL SDT.

In an embodiment of the present application, selecting the CAPC to be used for DL SDT based on the rule may include: selecting at least one of the following CAPCs to be used for the DL SDT; highest or lowest priority CAPC of a DCCH(s) if the DCCH SDU(s) is included for SDT; lowest priority CAPC of the logical channel(s) with MAC SDU multiplexed in this MAC PDU for SDT; lowest priority CAPC of the DTCH logical channel(s) with MAC SDU multiplexed in this MAC PDU for SDT; highest priority CAPC if only MAC CE(s) for SDT are included; highest priority CAPC if MAC CE(s) for SDT are included: highest or lowest priority CAPC of a DCCH(s) and the logical channel(s) with MAC SDU multiplexed in this MAC PDU for SDT; highest or lowest priority CAPC of a DCCH(s) and MAC CE(s) and the logical channel(s) with MAC SDU multiplexed in this MAC PDU for SDT; highest or lowest priority CAPC of a DCCH(s) and the DTCH logical channel(s) with MAC SDU multiplexed in this MAC PDU for SDT; highest or lowest priority CAPC of a DCCH(s) and MAC CE(s) and the DTCH logical channel(s) with MAC SDU multiplexed in this MAC PDU for SDT; highest or lowest priority CAPC of all the parts (for example, the RRC message, and/or MAC CE, and/or MAC SDU) which are multiplexed in this MAC PDU for SDT; highest or lowest priority; highest or lowest priority CAPC of a DCCH(s) and MAC CE(s) multiplexed in this MAC PDU for SDT; highest or lowest priority CAPC of MAC CE(s) and the logical channel(s) with MAC SDU multiplexed in this MAC PDU for SDT; and highest or lowest priority CAPC of MAC CE(s) and the DTCH logical channel(s) with MAC SDU multiplexed in this MAC PDU for SDT.

In an embodiment of the present application, the method is performed during RRC based SDT or RRC-less SDT.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter.

The computer executable instructions are programmed to implement the above method with the at least one receiver, the at least one transmitter and the at least one processor.

Embodiments of the present application provide a mechanism for selecting a CAPC when performing SDT (RRC based SDT or RRC-less SDT) on the shared spectrum.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed descriptions of the appended drawings are intended as descriptions of preferred embodiments of the present application and are not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
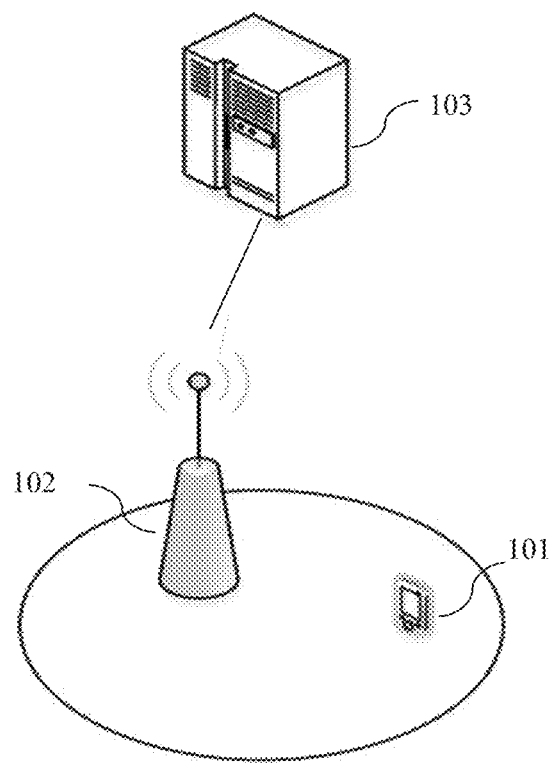
FIG. 1 illustrates a wireless communication system according to some embodiments of the present application.

FIG. 1 illustrates a wireless communication system according to some embodiments of the present application.

As shown in FIG. 1, the wireless communication system can include at least one base station (BS), at least one UE, and a core network (CN) node. Although a specific number of BSs and UEs, e.g., a BS (e.g., BS 102) and a UE (UE 101) are depicted in FIG. 1, one skilled in the art will recognize that any number of BSs and UEs may be included in the wireless communication system. As shown in FIG. 1, the BS 102 may be distributed over a geographic region and may communicate with the CN node 103 via an interface.

The UE 101 may be a computing device, such as a desktop computer, a laptop computer, a personal digital assistant (PDA), a tablet computer, a smart television (e.g., a television connected to the Internet), a set-top box, a game console, a security system (including security cameras), a vehicle on-board computer, a network device (e.g., router, switch, and modem), or the like. According to an embodiment of the present application, the UE 101 may be a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE 201 may be a wearable device, such as a smart watch, a fitness band, an optical head-mounted display, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

The BS 102 may communicate with a CN node 103 via an interface. In some embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s).

In an example, the CN node 103 can be a mobility management entity (MME) or a serving gateway (S-GW). In another embodiment of the present application, the CN node 103 may include a mobility management function (AMF) or a user plane function (UPF).

The wireless communication system may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, a long term evolution (LTE) network, a 3rd generation partnership project (3GPP)-based network, a 3GPP 5G network, a satellite communications network, a high altitude platform network, and/or other communications networks.

In some embodiments of the present application, the wireless communication system is compatible with 5G new radio of the 3GPP protocol, wherein BS 102 transmits data using an OFDM modulation scheme on the downlink (DL) and UE 101 transmits data on the uplink (UL) using a single-carrier frequency division multiple access (SC-FDMA) or OFDM scheme. More generally, however, the wireless communication system may implement some other open or proprietary communication protocols, for example, WiMAX, WiFi, among other protocols.

In some embodiments of the present application, the BS 102 may communicate using other communication protocols, such as the IEEE 802.11 family of wireless communication protocols. Further, in some embodiments of the present application, the BS 102 may communicate over licensed spectrums, whereas in other embodiments the BS 102 may communicate over unlicensed spectrums. Embodiments of the present application are not intended to be limited to the implementation of any particular wireless communication system architecture or protocol. In yet some embodiments of the present application, the BS 102 may communicate with UE 101 using 3GPP 5G protocols.

In an example, the UE 101 is not in RRC_CONNECTED state, for example, the UE could be in a RRC_IDLE state or in a RRC_INACTIVE state. When performing small data transmission, the UE 101 transmits packets to the BS 102, and the BS 102 transmits the small data to the CN node 103 via the interface.

Herein, the data transmission or small data transmission (SDT) may mean that a UE in an inactive state/mode or an idle state/mode could transmit the data to the network side (or network), or receive the data from the network side. The data transmission may include at least one of an uplink (UL) data transmission and downlink (DL) data transmission. After the completion of the data transmission, the inactive or idle UE may receive a suspend message or release message from the network and then go back to the inactive or idle mode. In some other embodiments of the present application, after the completion of the data transmission, the inactive or idle UE may receive a suspend message or release message from the network and the UE may still stay in inactive or idle mode during the data transmission procedure. In some embodiments of the present application, the suspend message or release message is an RRC message. In some embodiments of the present application, the data size in such data transmission may be no larger than a threshold, e.g. the maximum transport block (TB) size that can be applied in one transmission, as defined or configured in standard(s) or protocol(s). Small data transmission is one of such scenarios.

Currently, the work item (WID) on small data transmission (SDT) in a RRC_INACTIVE state is as follows:

For the RRC_INACTIVE state:

UL small data transmissions for RACH-based schemes (i.e. 2-step and 4-step RACH):

General procedure to enable UP data transmission for small data packets from INACTIVE state (e.g. using MSGA or MSG3) [RAN2]

Enable flexible payload sizes larger than the Rel-16 CCCH message size that is possible currently for INACTIVE state for MSGA and MSG3 to support UP data transmission in UL (actual payload size can be up to network configuration) [RAN2]

Context fetch and data forwarding (with and without anchor relocation) in INACTIVE state for RACH-based solutions [RAN2, RAN3]

Transmission of UL data on pre-configured PUSCH resources (i.e. reusing the configured grant type 1)—when TA is valid General procedure for small data transmission over configured grant type 1 resources from INACTIVE state [RAN2]

Configuration of the configured grant type1 resources for small data transmission in UL for INACTIVE state [RAN2]

No new RRC state should be introduced in this WID. Transmission of small data in UL, subsequent transmission of small data in UL and DL and the state transition decisions should be under network control. Focus of the WID should be on licensed carriers and the solutions can be reused for NR-U if applicable.

As illustrated in the WID, the solutions on licensed carriers can be reused for NR-U if applicable. For all the transmissions including UL and DL transmissions, the CAPC should be used by considering fairness between different traffic types and transmissions.

Currently, the CAPC is described in 3GPP TS 38.300 as follows: The Channel Access Priority Classes (CAPC) of radio bearers and MAC CEs are either fixed or configurable:

Fixed to the lowest priority for the padding buffer status report (BSR) and recommended bit rate MAC CEs;

Fixed to the highest priority for SRB0, SRB1, SRB3 and other MAC CEs;

Configured by the gNB for SRB2 and DRB.

When choosing the CAPC of a DRB, the gNB takes into account the 5G QoS Identifier (5QIs) of all the quality of service (QoS) flows multiplexed in that DRB while considering fairness between different traffic types and transmissions. Table 5.6.2-1 below shows which CAPC should be used for which standardized 5QIs i.e. which CAPC to use for a given QoS flow.

NOTE: A QoS flow corresponding to a non-standardized 5QI (i.e. operator specific 5QI) should use the CAPC of the standardized 5QI which best matches the QoS characteristics of the non-standardized 5QI.

TABLE 5.6.2-1

| Mapping between Channel Access Priority Classes and 5QI | |
| --- | --- |
| CAPC | 5QI |
| 1 | 1, 3, 5, 65, 66, 67, 69, 70, 79, 80, 82, 83, 84, |
| 2 | 2, 7, 71 |
| 3 | 4, 6, 8, 9, 72, 73, 74, 76 |
| 4 | — |

NOTE:

lower CAPC value means higher priority

When performing Type 1 LBT for the transmission of an uplink TB (see TS 37.213 [37], clause 4.2.1.1) and when the CAPC is not indicated in the DCI, the UE shall select the CAPC as follows:

If only MAC CE(s) are included in the TB, the highest priority CAPC of those MAC CE(s) is used; or If CCCH SDU(s) are included in the TB, the highest priority CAPC is used; or If DCCH SDU(s) are included in the TB, the highest priority CAPC of the DCCH(s) is used; or The lowest priority CAPC of the logical channel(s) with MAC SDU multiplexed in the TB is used otherwise.

Currently, LTE early data transmission (EDT) has not been considered to be applied in the shared spectrum yet. In NR, it is not possible to multiplex common control channel (CCCH) and dedicated traffic channel (DTCH) due to the CCCH is used for UEs having no RRC connection with the network, while the DTCH is a point-to-point channel, dedicated to one UE, for the transfer of user information. Correspondingly, in NR-U, the existing CAPC selection considers the case of signaling radio bearer SRB0 which is carried on the CCCH and the case of multiplexed data transmission separately, as described in 3GPP TS 38.300. The CAPC could be indicated in downlink control information (DCI) by network (NW) to the UE for the UL transmission or the UE may select the CAPC according to some specified rules in legacy.

RRC based SDT indicates at least one certain RRC message is included during the SDT is performing. For example, RRCResumeRequest message may be included in the UL SDT, RRCResume or RRCRelease message may be included in the DL SDT. Therefore, for RRC based SDT, it means the UL transmission may include RRCResumeRequest and data, and the DL transmission may include RRCResume/RRCRelease and data. In some embodiments, RRC based SDT indicates the SDT for RACH-based schemes. In some other embodiments, RRC based SDT indicates the SDT on pre-configured physical uplink shared channel (PUSCH) resources. Since the RRCResumeRequest message is SRB0 message and the RRCResume/RRCRelease message is SRB1 message, there is no corresponding CAPC defined for which can be used for SDT if there is no DCI indication. The related issue has not been discussed yet in 3GPP.

In contrast to a RRC based SDT, a RRC-less SDT indicates that at least RRCResumeRequest is not included in the UL SDT, RRCResume/RRCRelease is not included in the DL SDT during the SDT is performing. In some embodiments, an RRC-less SDT indicates only the SDT is performed on pre-configured PUSCH resources without a RRC message(s).

Currently, for SDT, both a RRC based SDT and a RRC-less SDT are under discussion in 3GPP. No matter which mechanism is used, the purposes to transmit data in the RRC_INACTIVE state are the same for the two mechanisms. Then whether the same CAPC can be selected for a RRC-less SDT or a RRC based SDT should be determined.

A mechanism for selecting a CAPC to be used when SDT is performed will be discussed in the following description of the present application. The following description will describe the method for selecting a CAPC to be used during a RRC based SDT procedure or a RRC-less SDT procedure in conjunction with FIG. 2 and FIG. 3, respectively.

Selecting CAPC During RRC Based SDT

Figure 2:
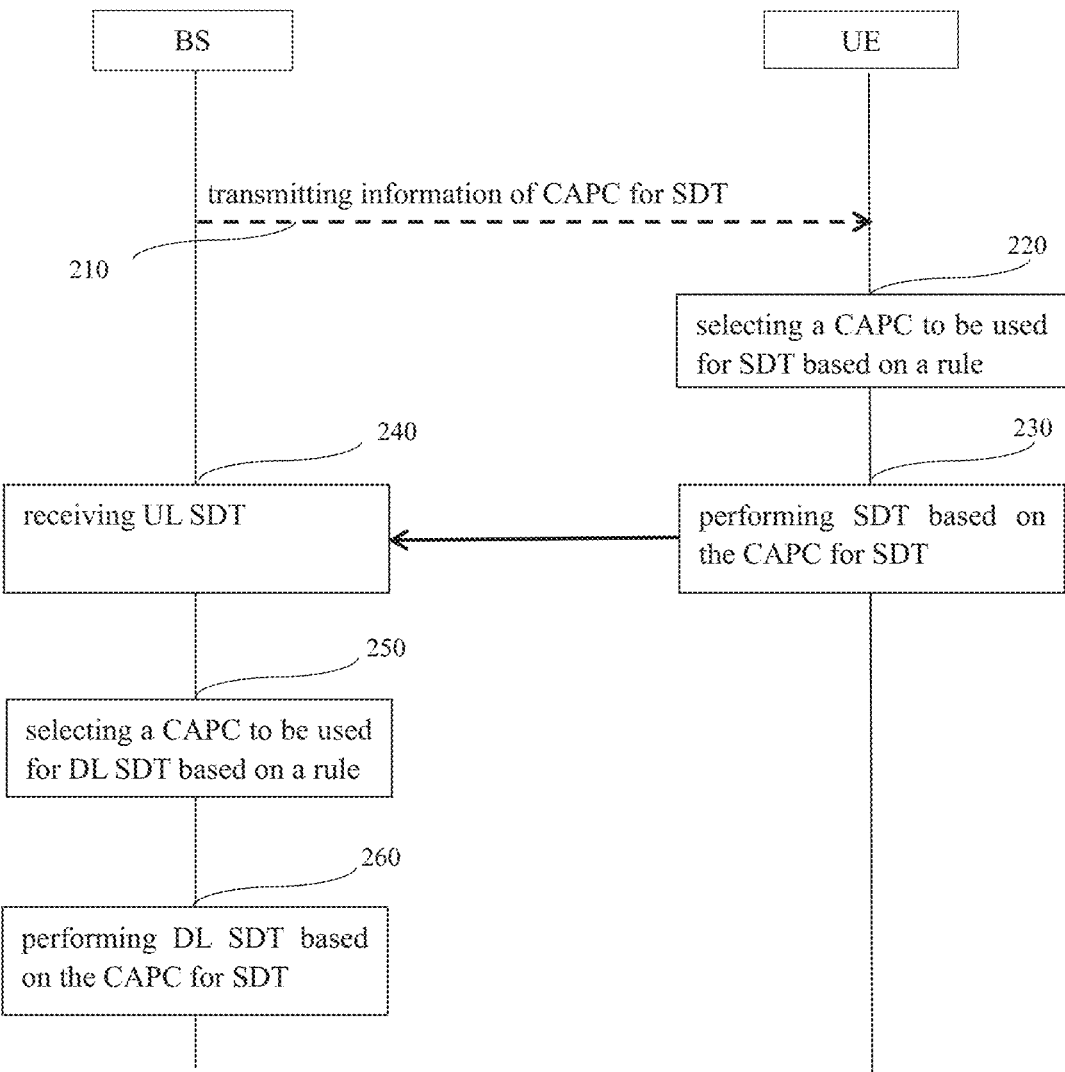
FIG. 2 illustrates a flow chart of a method for selecting a CAPC during a RRC based SDT procedure according to some embodiments of the present application.

FIG. 2 illustrates a flow chart of a method for selecting a CAPC during a RRC based SDT procedure according to some embodiments of the present application. The method in FIG. 2 is performed between a BS (e.g., BS 102 in FIG. 1) and a UE (e.g., UE 101 in FIG. 1).

As shown in FIG. 2, in step 210, the BS (or the network (NW)) may transmit information of the CAPC for SDT. For example, the information of the CAPC for SDT may be transmitted by a system broadcast message or RRC signaling. For example, the CAPC for SDT may be included in a RRC message (e.g., RRCRelease, RRCReconfiguration). In another example, the BS may broadcast the CAPC for SDT in the system information. In another example, the information of the CAPC for SDT can be configured in a configuration message of the SDT by a system broadcast message or RRC signaling.

Furthermore, the BS may define, configure or broadcast the same or different CAPC to be used for the related content for SDT.

In an embodiment, if SRB0, SRB1 or SRB3 is included for SDT (for example, CCCH SDU(s) carries SRB0, DCCH SDU(s) carries SRB1 and SRB3), the BS may define, configure or broadcast the CAPC to be used for SRB0, SRB1 and SRB3.

Furthermore, in another embodiment, if assistant information or security information for SDT is included in the RRC message or the assistant information or the security information for SDT is a separate RRC message, the BS may define, configure or broadcast the CAPC to be used for: (1) SRB (e.g., SRB0, SRB1 or SRB3) with the assistant information or the security information for SDT; (2) the assistant information or the security information for SDT; or (3) the logical channel including the assistant information or the security information.

In another embodiment, the BS may define, configure or broadcast a CAPC to be used for an entire SDT message.

In another embodiment, the BS may define, configure or broadcast a CAPC to be used for the data part of SDT.

In another embodiment, the BS may define, configure or broadcast a CAPC to be used for each logical channel.

In another embodiment, the BS may define, configure or broadcast a CAPC to be used for each DTCH logical channel. The DTCH logical channel may indicate the data part of SDT.

In another embodiment, the BS may define, configure or broadcast a CAPC to be used for medium access control (MAC) control element (CE).

In another embodiment, the BS may define, configure or broadcast a CAPC to be used for data radio bearer (DRB).

It should be understood that in some other embodiments of the present application, step 210 may not be performed if the CAPC for SDT has been transmitted to the UE in advance, or the CAPC for the SDT is predefined.

Furthermore, the value of the CAPC for SDT can be equal to, higher or lower than any existed CAPC. And the value of the CAPC for SDT can be any number in or out the existed table (e.g., Table 5.6.2-1 as described in 3GPP TS 38.300 listed above). For example, the value of the CAPC for SDT can be any one value from 1-4 or additional new value.

In step 220, the UE may select a CAPC to be used for SDT based on a rule.

In an embodiment, if the BS defines, configures or broadcasts a CAPC to be used for the related content for SDT (such as, the entire SDT message, the data part of SDT, or the like as mentioned above), or the CAPC to be used for the related content for SDT is predefined, the UE may select the CAPC for SDT to be used when performing the UL SDT.

For example, for uplink small data transmissions (CG based (Transmission of UL data on pre-configured PUSCH resources) or RACH based as illustrated in WID) e.g. on configured grants, by MSG3 or MSGA PUSCH transmissions, or on other uplink resources where the UE performs LBT or Type 1 LBT and the CAPC is not indicated by the NW or in the DCI, the UE shall select the CAPC for SDT when performing the SDT.

In another example, when performing LBT or Type 1 LBT for the SDT of an uplink transport block (TB) and when the CAPC is not indicated by the NW or in the DCI, the UE shall select the CAPC for SDT when performing the SDT.

In another embodiment, the UE may select the CAPC to be used for SDT based on the rule by selecting at least one of the following CAPCs to be used for the SDT (it should be understood that the rule may be configured by NW or predefined): highest or lowest priority CAPC of a common control channel (CCCH)(s) if the CCCH and/or dedicated control channel (DCCH) service data unit (SDU)(s) is included for SDT:

- highest or lowest priority CAPC of the logical channel(s) with MAC SDU multiplexed in this MAC protocol data unit (PDU) for SDT;
- highest or lowest priority CAPC of the DTCH logical channel(s) with MAC SDU multiplexed in this MAC PDU for SDT;
- highest or lowest priority CAPC of the MAC CE(s) multiplexed in the MAC PDU if only MAC CE(s) for SDT are included;
- highest or lowest priority CAPC of the MAC CE(s) multiplexed in the MAC PDU if MAC CE(s) for SDT are included;
- highest or lowest priority CAPC of a CCCH(s) and/or DCCH(s) and the logical channel(s) with MAC SDU multiplexed in this MAC PDU for SDT;
- highest or lowest priority CAPC of a CCCH(s) and/or DCCH(s) and MAC CE(s) and the logical channel(s) with MAC SDU multiplexed in this MAC PDU for SDT;
- highest or lowest priority CAPC of a CCCH(s) and/or DCCH(s) and the DTCH logical channel(s) with MAC SDU multiplexed in this MAC PDU for SDT;
- highest or lowest priority CAPC of a CCCH(s) and/or DCCH(s) and MAC CE(s) and the DTCH logical channel(s) with MAC SDU multiplexed in this MAC PDU for SDT;
- highest or lowest priority CAPC of all the parts (for example, the RRC message, and/or MAC CE, and/or MAC SDU) which are multiplexed in this MAC PDU for SDT;
- highest or lowest priority;
- highest or lowest priority CAPC of CCCH(s) and MAC CE(s) multiplexed in this MAC PDU for SDT; and
- highest or lowest priority if CCCH SDU(s) carrying SRB0 is included for SDT.

For example, if the BS defines, configures or broadcasts a CAPC to be used for the related content for SDT (such as, the data part of SDT, each logical channel, MAC CE, or the like as mentioned above), or the CAPC to be used for the related content for SDT is predefined, the UE may select at least one of the above CAPCs to be used for SDT in this embodiment by using the configured or predefined CAPC for the related content for SDT and/or the existed CAPC in the existed table.

In another example, if no CAPC for SDT is configured, broadcasted or predefined (that is, there is only the existed CAPC), for example, for uplink small data transmissions (CG based or RACH based) e.g., on configured grants, by MSG3 or MSGA PUSCH transmissions, or on other uplink resources where the UE performs LBT or Type 1 LBT and CAPC is not indicated by the NW or in the DCI, the UE may select at least one of the above CAPCs to be used for SDT in this embodiment by using the existed CAPC in the existed table.

And then in step 230, the UE may perform SDT based on the selected CAPC for SDT.

In an embodiment, if a consistent LBT (per UL resource or per UL BWP) failure for SDT is triggered, the UE may re-assemble MAC PDU including only a highest priority CAPC part in a previous MAC PDU (e.g. the RRC signaling and/or MAC CE and/or the highest priority CAPC of the logical channel(s) with MAC SDU multiplexed in this MAC PDU for SDT) to improve the priority. For example, the consistent LBT failure for SDT is triggered in response to the number of the LBT failure indications exceeding or being equal to a predetermined threshold within the predetermined time duration for the UL resource for SDT.

When re-assembling the MAC PDU, the data which has been included in the MAC PDU for SDT should be stored. The lower layer (such as, physical layer) performs an LBT procedure before the transmission of the re-assembled MAC PDU. If the LBT fails for the re-assembled MAC PDU transmission, the MAC entity may indicate a consistent LBT failure for SDT to upper layers (such as RRC layer). If the LBT failure indication is not received from lower lay for the re-assembled MAC PDU, the MAC entity may cancel the triggered consistent LBT failure.

In step 240, the BS receives UL SDT from the UE.

In step 250, the BS may select a CAPC to be used for DL SDT based on a rule.

In an embodiment, for downlink small data transmissions (CG based or RACH based) on configured grants, by MSG4 or MSGB PDSCH transmissions, or on other downlink resources, the BS (NW) may use the equivalent priority CAPC with the received UL SDT. In particular, after receiving the UL SDT from the UE, the BS may determine the CAPC of the UL SDT based on the rule selected or used by the UE (in step 220) and the corresponding priority CAPC of the content contained in the UL SDT, and then the BS may use the same priority CAPC as the received UL SDT.

In another embodiment, for downlink small data transmissions (CG based or RACH based) on configured grants, by MSG4 or MSGB PDSCH transmissions, or on other downlink resources where the NW performs LBT or Type 1 LBT, the BS may select the CAPC to be used based on the rule by selecting at least one of the following CAPCs to be used for the SDT:

- highest or lowest priority CAPC of a DCCH(s) if a DCCH SDU(s) is included for SDT;
- highest or lowest priority CAPC of logical channel(s) with MAC SDU multiplexed in this MAC PDU for SDT;

highest or lowest priority CAPC of DTCH logical channel(s) with MAC SDU multiplexed in this MAC PDU for SDT;

highest or lowest priority CAPC of the MAC CEs multiplexed in the MAC PDU if only MAC CE(s) for SDT are included;

highest or lowest priority CAPC of the MAC CEs multiplexed in the MAC PDU if MAC CE(s) for SDT are included;

highest or lowest priority CAPC of a DCCH(s) and logical channel(s) with MAC SDU multiplexed in this MAC PDU for SDT;

highest or lowest priority CAPC of a DCCH(s) and MAC CE(s) and logical channel(s) with MAC SDU multiplexed in this MAC PDU for SDT;

highest or lowest priority CAPC of a DCCH(s) and DTCH logical channel(s) with MAC SDU multiplexed in this MAC PDU for SDT;

highest or lowest priority CAPC of a DCCH(s) and MAC CE(s) and DTCH logical channel(s) with MAC SDU multiplexed in this MAC PDU for SDT; highest or lowest priority CAPC of all the parts (for example, the RRC message, and/or MAC CE, and/or MAC SDU) which are multiplexed in this MAC PDU for SDT;

highest or lowest priority; and highest or lowest priority CAPC of a DCCH(s) and MAC CE(s) multiplexed in this MAC PDU for SDT.

And then in step 260, the BS may perform DL SDT based the selected CAPC for SDT.

Selecting CAPC During RRC-Less SDT

Figure 3:
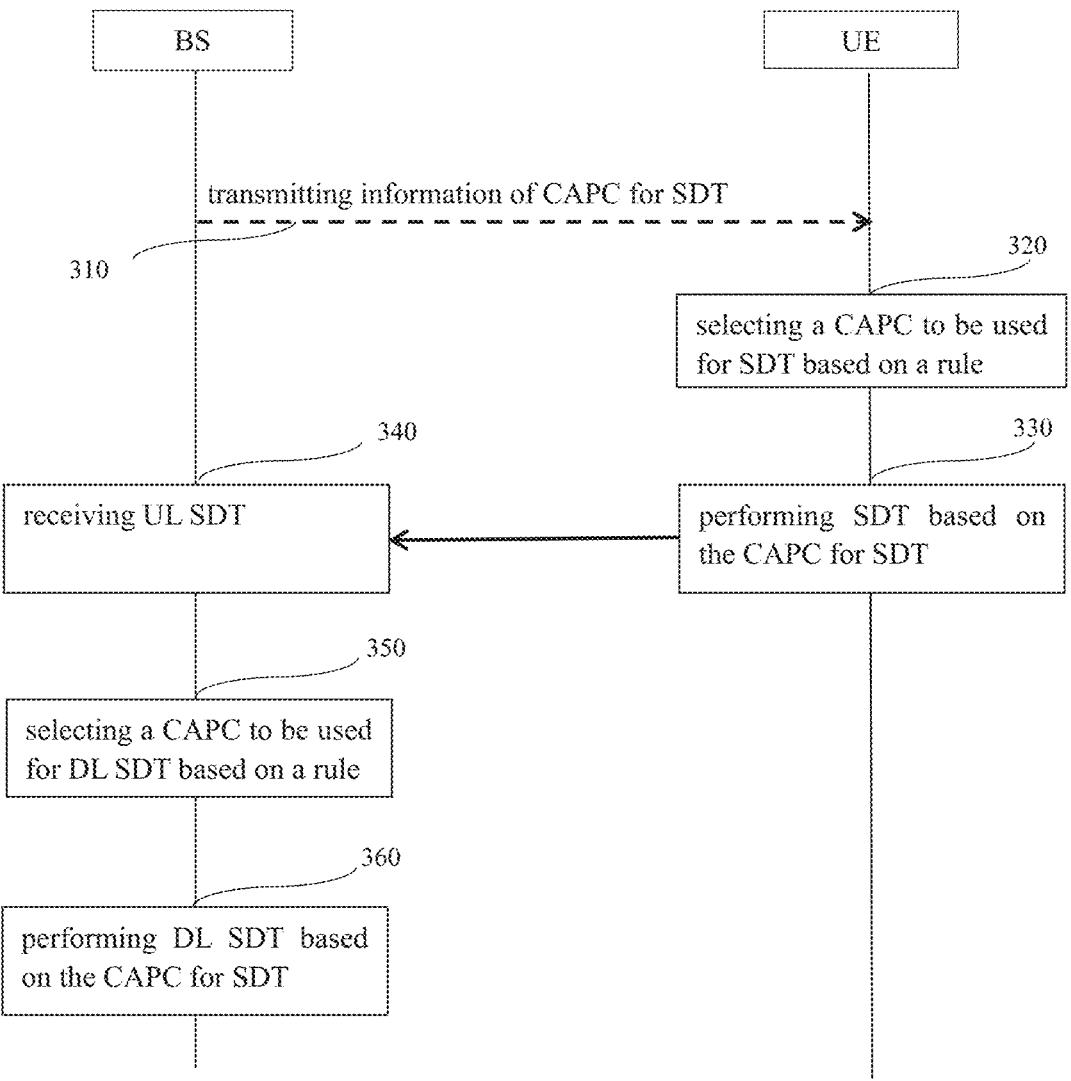
FIG. 3 illustrates a flow chart of a method for selecting a CAPC during a RRC-less SDT procedure according to some embodiments of the present application.

FIG. 3 illustrates a flow chart of a method for selecting a CAPC during a RRC-less SDT procedure according to some embodiments of the present application. The method in FIG. 3 is performed between a BS (e.g., BS 102 in FIG. 1) and a UE (e.g., UE 101 in FIG. 1).

As shown in FIG. 3, in step 310, the BS (or NW) may transmit information of the CAPC for SDT. It should be understood that in some other embodiments of the present application, step 310 may not be performed if the CAPC for SDT has been transmitted to the UE in advance, or the CAPC for SDT is predefined.

The step 310 is similar to the step 210 in FIG. 2 for a RRC based SDT procedure, and thus the same description for step 310 will not be described in detail to avoid repetition.

In some embodiments, the same value of the CAPC for SDT may be used to a RRC based SDT and a RRC-less SDT. In other embodiments, if multiple separate CAPCs for SDT are configured, broadcasted or predefined, some CAPCs may be for RRC based SDT and at least one CAPC may be used for RRC-less SDT.

In step 320, the UE may select a CAPC to be used for SDT based on a rule.

In an embodiment, if the BS defines, configures or broadcasts a CAPC to be used for the related content for SDT (such as, the entire SDT message, the data part of SDT, or the like as mentioned above), or the CAPC to be used for the related content for SDT is predefined, the UE may select the CAPC for SDT to be used when performing UL SDT.

In another embodiment, the UE may select the same CAPC for SDT with RRC based SDT by assuming one or more certain RRC messages (e.g. RRCResumeRequest is included in the UL SDT, RRCResume/RRCRelease is included in the DL SDT) is included as RRC based SDT, if the rule for selecting CAPC is not configured or defined for the RRC-less SDT.

In another embodiment, the UE may select the CAPC to be used for SDT based on the rule by selecting at least one of the following CAPCs to be used for the SDT (it should be understood that the rule may be configured by NW or predefined): highest or lowest priority CAPC of the logical channel(s) with MAC SDU multiplexed in this MAC PDU for SDT;

highest or lowest priority CAPC of the DTCH logical channel(s) with MAC SDU multiplexed in this MAC PDU for SDT;

highest or lowest priority CAPC of the MAC CEs multiplexed in the MAC PDU if only MAC CE(s) for SDT are included;

highest or lowest priority CAPC of the MAC CEs multiplexed in the MAC PDU if MAC CE(s) for SDT are included;

highest or lowest priority CAPC of MAC CE(s) and the logical channel(s) with MAC SDU multiplexed in this MAC PDU for SDT (the logical channel(s) here may include the potential assistant information on CCCH);

highest or lowest priority CAPC of MAC CE(s) and the DTCH logical channel(s) with MAC SDU multiplexed in this MAC PDU for SDT;

highest or lowest priority CAPC of all the parts (for example, the RRC message (except for RRCResumeRequest), and/or MAC CE, and/or MAC SDU(s) which are multiplexed in this MAC PDU for SDT;

highest or lowest priority;

highest or lowest priority CAPC of a CCCH(s) and MAC CE(s) multiplexed in this MAC PDU for SDT; and highest or lowest priority if CCCH SDU(s) carrying SRB) is included for SDT.

For example, if the BS defines, configures or broadcasts a CAPC to be used for the related content for SDT (such as, the data part of SDT, each logical channel, MAC CE, or the like as mentioned above), or the CAPC to be used for the related content for SDT is predefined, the UE may select at least one of the above CAPCs to be used for SDT in this embodiment by using the configured or predefined CAPC for the related content for SDT and/or the existed CAPC in the existed table.

In another example, if no CAPC for SDT is configured, broadcasted or predefined (that is, there is only the existed CAPC), for example, for uplink small data transmissions (CG based or RACH based) e.g., on configured grants, by MSG3 or MSGA PUSCH transmissions, or on other uplink resources where the UE performs LTB or Type 1 LBT and CAPC is not indicated by the NW or in the DCI, the UE may select at least one of the above CAPCs to be used for SDT in this embodiment by using the existed CAPC in the existed table.

And then in step 330, the UE may perform SDT based on the selected CAPC for SDT.

In an embodiment, if a consistent LBT (per UL resource or per UL BWP) for SDT is triggered, the UE may re-assemble MAC PDU including only a highest priority CAPC part in a previous MAC PDU (e.g. the RRC signaling and/or MAC CE and/or the highest priority CAPC of the logical channel(s) with MAC SDU multiplexed in this MAC PDU for SDT) to improve the priority. When re-assembling the MAC PDU, the data which has been included in the MAC PDU for SDT should be stored. The lower layer (such as physical layer) performs an LBT procedure before the transmission of the re-assembled MAC PDU. If the LBT fails for the re-assembled MAC PDU transmission, the MAC entity may indicate a consistent LBT failure for SDT to upper layers (such as RRC layer). If the LBT failure indication is not received from lower lay for the re-assembled MAC PDU, the MAC entity may cancel the triggered consistent LBT failure.

In step 340, the BS receives UL SDT from the UE.

In step 350, the BS may select a CAPC to be used for DL SDT based on a rule.

In an embodiment, for downlink small data transmissions (CG based or RACH based) on configured grants, by MSG4 or MSGB PDSCH transmissions, or on other downlink resources, the BS (NW) should use the equivalent priority CAPC with the received UL SDT. In particular, after receiving the UL SDT from the UE, the BS may determine the CAPC of the UL SDT based on the rule selected or used by the UE (in step 320) and the corresponding priority CAPC of the content, and then the BS may use the same priority CAPC as the received UL SDT.

In another embodiment, for downlink small data transmissions (CG based or RACH based) on configured grants, by MSG4 or MSGB PDSCH transmissions, or on other downlink resources where the NW performs LBT or Type 1 LBT, the BS may select the CAPC to be used based on the rule by selecting at least one of the following CAPCs to be used for the SDT:

- highest or lowest priority CAPC of a DCCH(s) if the DCCH SDU(s) is included for SDT (the DCCH(s) here may include the potential assistant information on a DCCH);
- highest or lowest priority CAPC of the logical channel(s) with MAC SDU multiplexed in this MAC PDU for SDT;
- highest or lowest priority CAPC of the DTCH logical channel(s) with MAC SDU multiplexed in this MAC PDU for SDT;
- highest or lowest priority CAPC of the MAC CEs multiplexed in the MAC PDU if only MAC CE(s) for SDT are included;
- highest or lowest priority CAPC of the MAC CEs multiplexed in the MAC PDU if MAC CE(s) for SDT are included;
- highest or lowest priority CAPC of MAC CE(s) and the logical channel(s) with MAC SDU multiplexed in this MAC PDU for SDT;
- highest or lowest priority CAPC of MAC CE(s) and the DTCH logical channel(s) with MAC SDU multiplexed in this MAC PDU for SDT;
- highest or lowest priority CAPC of all the parts (for example, the RRC message (except for RRCResume/RRCRelease), and/or MAC CE, and/or MAC SDU) which are multiplexed in this MAC PDU for SDT;
- highest or lowest priority; and
- highest or lowest priority CAPC of a DCCH(s) and MAC CE(s) multiplexed in this MAC PDU for SDT.

And then in step 360, the BS may perform DL SDT based the selected CAPC for SDT.

Through the embodiments of the present application, a mechanism for selecting a CAPC when performing SDT (RRC based SDT or RRC-less SDT) on the shared spectrum is provided.

Figure 4:
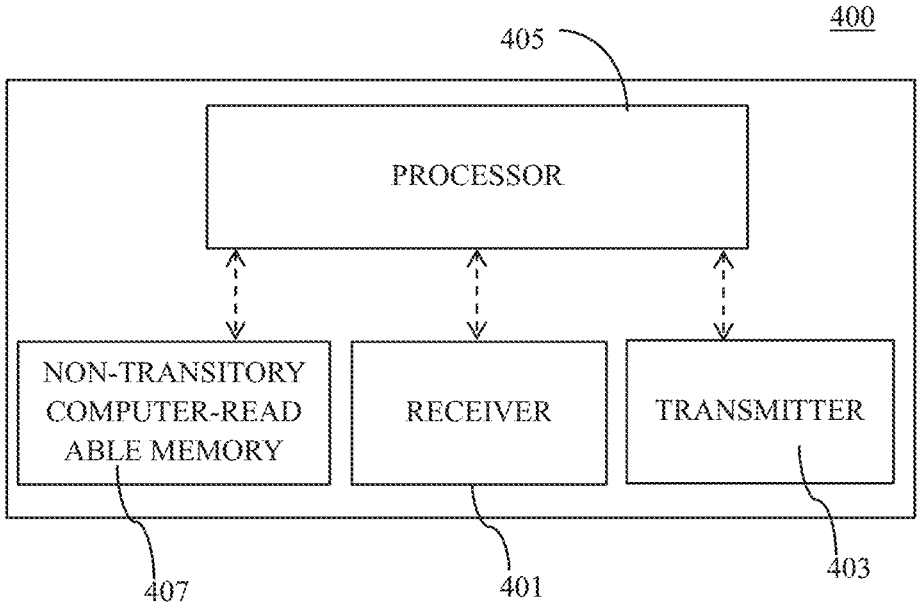
FIG. 4 illustrates an apparatus according to some embodiments of the present application.

FIG. 4 illustrates an apparatus according to some embodiments of the present application. In some embodiments of the present application, the apparatus 400 may be the UE 101 as illustrated in FIG. 1 or other embodiments of the present application.

As shown in FIG. 4, the apparatus 400 may include a receiver 401, a transmitter 403, a processor 405, and a non-transitory computer-readable medium 407. The non-transitory computer-readable medium 407 has computer executable instructions stored therein. The processer 405 is configured to be coupled to the non-transitory computer readable medium 407, the receiver 401, and the transmitter 403. It is contemplated that the apparatus 400 may include more computer-readable mediums, receiver, transmitter and processors in some other embodiments of the present application according to practical requirements. In some embodiments of the present application, the receiver 401 and the transmitter 403 are integrated into a single device, such as a transceiver. In certain embodiments, the apparatus 400 may further include an input device, a memory, and/or other components.

In some embodiments of the present application, the non-transitory computer-readable medium 407 may have stored thereon computer-executable instructions to cause the apparatus 400 to implement the method according to embodiments of the present application.

Figure 5:
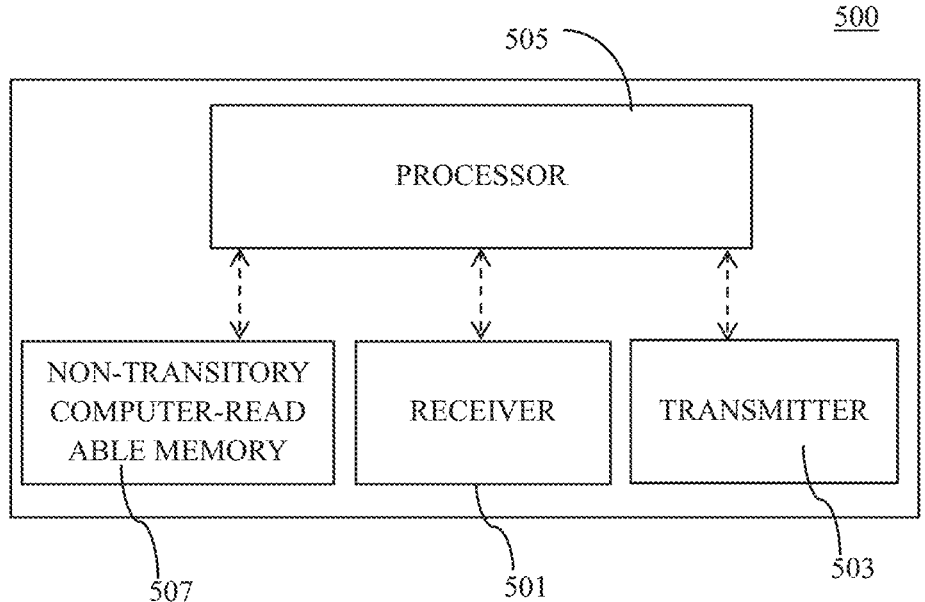
FIG. 5 illustrates another apparatus according to some other embodiments of the present application.

FIG. 5 illustrates another apparatus according to some embodiments of the present application. In some embodiments of the present application, the apparatus 500 may be the BS 102 as illustrated in FIG. 1 or other embodiments of the present application.

As shown in FIG. 5, the apparatus 500 may include a receiver 501, a transmitter 503, a processer 505, and a non-transitory computer-readable medium 507. The non-transitory computer-readable medium 507 has computer executable instructions stored therein. The processer 505 is configured to be coupled to the non-transitory computer readable medium 507, the receiver 501, and the transmitter 503. It is contemplated that the apparatus 500 may include more computer-readable mediums, receiver, transmitter and processors in some other embodiments of the present application according to practical requirements. In some embodiments of the present application, the receiver 501 and the transmitter 503 are integrated into a single device, such as a transceiver. In certain embodiments, the apparatus 500 may further include an input device, a memory, and/or other components.

In some embodiments of the present application, the non-transitory computer-readable medium 507 may have stored thereon computer-executable instructions to cause the apparatus 500 to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory. ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method, performed by a user equipment (UE), comprising:

selecting a channel access priority class (CAPC) to be used for small data transmission (SDT) based on a rule if a CAPC for SDT is not indicated by a base station;

performing SDT based on the CAPC for SDT; and wherein the selecting of CAPC for the SDT and the performing of the SDT are based on the selected CAPC for uplink (UL) SDT during at least configured grant (CG) based SDT, and wherein selecting the CAPC to be used for SDT based on a rule comprises selecting a highest or lowest priority CAPC of at least one common control channel (CCCH) if the CCCH or at least one dedicated control channel (DCCH) service data unit (SDU) or MAC CE is included for SDT.

2. The method of claim 1, further comprising: (i) receiving information of the CAPC for SDT by a system broadcast message or radio resource control (RRC) signaling, or (ii) predefining the CAPC for SDT.

3. The method of claim 2, wherein the information of the CAPC for SDT is used for one or more of:

at least one of signaling radio bearer (SRB)0, SRB1, and SRB3;

assistant information for SDT and at least one of SRB0, SRB1, and SRB3;

logical channel including assistant information for SDT;

an entire SDT message;

data part of SDT or each dedicated traffic channel (DTCH) logical channel;

each logical channel;

medium access control (MAC) control element (CE); or data radio bearer (DRB).

4. The method of claim 1, wherein selecting the CAPC to be used for SDT based on a rule comprises: selecting at least one of:

lowest priority CAPC of at least one logical channel with medium access control (MAC) SDU multiplexed in a MAC protocol data unit (PDU) for SDT;

lowest priority CAPC of at least one dedicated traffic channel (DTCH) logical channel with MAC SDU multiplexed in the MAC PDU for SDT;

highest priority CAPC if only at least one MAC control element (CE) for SDT is included;

highest priority CAPC if at least one MAC CE for SDT is included;

highest or lowest priority CAPC of at least one CCCH and/or at least one DCCH and at least one logical channel with MAC SDU multiplexed in the MAC PDU for SDT;

highest or lowest priority CAPC of at least one CCCH and/or at least one DCCH and at least one MAC CE and at least one logical channel with MAC SDU multiplexed in the MAC PDU for SDT;

highest or lowest priority CAPC of at least one CCCH and/or at least one DCCH and at least one dedicated traffic channel (DTCH) logical channel with MAC SDU multiplexed in the MAC PDU for SDT;

highest or lowest priority CAPC of at least one CCCH and/or at least one DCCH and at least one MAC CE and at least one DTCH logical channel with MAC SDU multiplexed in the MAC PDU for SDT;

highest or lowest priority CAPC of all parts which are multiplexed in the MAC PDU for SDT;

highest or lowest priority;

highest or lowest priority CAPC of at least one CCCH(s) and at least one MAC CE multiplexed in the MAC PDU for SDT;

highest or lowest priority if CCCH SDU(s) carrying signaling radio bearer (SRB)0 is included for SDT;

highest or lowest priority CAPC of at least one MAC CE and at least one logical channel with MAC SDU multiplexed in the MAC PDU for SDT; or highest or lowest priority CAPC of at least one MAC CE and at least one DTCH logical channel with MAC SDU multiplexed in the MAC PDU for SDT.

5. The method of claim 4, further comprising: re-assembling the MAC PDU including only a highest priority CAPC part in a previous MAC PDU if a consistent listen before talk (LBT) failure for SDT is triggered.

6. A base station (BS) for wireless communication, comprising:

at least one memory; and at least one processor coupled with the at least one memory and configured to cause the BS to:

receive uplink (UL) small data transmission (SDT) from a user equipment (UE);

select a channel access priority class (CAPC) to be used for downlink (DL) SDT based on a rule; and wherein the UL SDT is based on the selected CAPC for uplink (UL) SDT during at least configured grant (CG) based SDT, and wherein receiving the CAPC to be used for SDT based on a rule comprises receiving a highest or lowest priority CAPC of at least one common control channel (CCCH) if the CCCH or at least one dedicated control channel (DCCH) service data unit (SDU) or MAC CE is included for SDT.

7. The BS of claim 6, wherein the at least one processor is configured to cause the BS to: transmit information of the CAPC for SDT by a system broadcast message or radio resource control (RRC) signaling.

8. The BS of claim 7, wherein the information of the CAPC for SDT is used for one or more of:

at least one of signaling radio bearer (SRB)0, SRB1, and SRB3;

assistant information for SDT and at least one of SRB0, SRB1, and SRB3;

logical channel including assistant information for SDT;

an entire SDT message;

data part of SDT or each dedicated traffic channel (DTCH) logical channel;

each logical channel;

medium access control (MAC) control element (CE); or data radio bearer (DRB).

9. The BS of claim 6, wherein to select the CAPC to be used for the DL SDT based on the rule comprises: use an equivalent priority CAPC with the received UL SDT.

10. The BS of claim 6, wherein to select the CAPC to be used for DL SDT based on the rule comprises: select at least one of:

lowest priority CAPC of at least one logical channel with MAC SDU multiplexed in a MAC PDU for SDT;

lowest priority CAPC of at least one DTCH logical channel with MAC SDU multiplexed in the MAC PDU for SDT;

highest priority CAPC if only at least one MAC CE for SDT is included;

highest priority CAPC if at least one MAC CE for SDT is included;

highest or lowest priority CAPC of at least one DCCH and at least one logical channel with MAC SDU multiplexed in the MAC PDU for SDT;

highest or lowest priority CAPC of at least one DCCH and at least one MAC CE and at least one logical channel with MAC SDU multiplexed in the MAC PDU for SDT;

highest or lowest priority CAPC of at least one DCCH and at least one DTCH logical channel with MAC SDU multiplexed in the MAC PDU for SDT;

highest or lowest priority CAPC of at least one DCCH and at least one MAC CE and at least one DTCH logical channel with MAC SDU multiplexed in the MAC PDU for SDT;

highest or lowest priority CAPC of all parts which are multiplexed in the MAC PDU for SDT;

highest or lowest priority;

highest or lowest priority CAPC of at least one DCCH and at least one MAC CE multiplexed in the MAC PDU for SDT;

highest or lowest priority CAPC of at least one MAC CE and at least one logical channel with MAC SDU multiplexed in the MAC PDU for SDT; or highest or lowest priority CAPC of at least one MAC CE and at least one DTCH logical channel with MAC SDU multiplexed in the MAC PDU for SDT.

11. A user equipment (UE) for wireless communication, comprising:

at least one memory; and at least one processor coupled with the at least one memory and configured to cause the UE to:

select a channel access priority class (CAPC) to be used for small data transmission (SDT) based on a rule if the CAPC for SDT is not indicated by a base station;

perform SDT based on the CAPC for SDT; and wherein the selecting of CAPC for the SDT and the performing of the SDT are based on the selected CAPC for uplink (UL) SDT during at least configured grant (CG) based SDT, and wherein selecting the CAPC to be used for SDT based on a rule comprises selecting a highest or lowest priority CAPC of at least one common control channel (CCCH) if the CCCH or at least one dedicated control channel (DCCH) service data unit (SDU) or MAC CE is included for SDT.

12. The UE of claim 11, wherein the at least one processor is configured to cause the UE to: receive information of the CAPC for SDT by a system broadcast message or radio resource control (RRC) signaling or predefining the CAPC for SDT.

13. The UE of claim 12, wherein the at least one processor is configured to cause the UE to: receive the information of the CAPC for SDT in a configuration message of the SDT.

14. The UE of claim 12, wherein the information of the CAPC for SDT is used for one or more of:

at least one of signaling radio bearer (SRB)0, SRB1, and SRB3;

assistant information for SDT and at least one of SRB0, SRB1, and SRB3;

logical channel including assistant information for SDT;

an entire SDT message;

data part of SDT or each dedicated traffic channel (DTCH) logical channel;

each logical channel;

medium access control (MAC) control element (CE); or data radio bearer (DRB).

15. The UE of claim 11, wherein to select the CAPC to be used for SDT based on a rule is to select at least one of:

lowest priority CAPC of at least one logical channel with medium access control (MAC) SDU multiplexed in a MAC protocol data unit (PDU) for SDT;

lowest priority CAPC of at least one dedicated traffic channel (DTCH) logical channel with MAC SDU multiplexed in the MAC PDU for SDT;

highest priority CAPC if only at least one MAC control element (CE) for SDT is included;

highest priority CAPC if at least one MAC CE for SDT is included;

highest or lowest priority CAPC of at least one CCCH and/or at least one DCCH and at least one logical channel with MAC SDU multiplexed in the MAC PDU for SDT;

highest or lowest priority CAPC of at least one CCCH and/or at least one DCCH and at least one MAC CE and at least one logical channel with MAC SDU multiplexed in the MAC PDU for SDT;

highest or lowest priority CAPC of at least one CCCH and/or at least one DCCH and at least one dedicated traffic channel (DTCH) logical channel with MAC SDU multiplexed in the MAC PDU for SDT;

highest or lowest priority CAPC of at least one CCCH and/or at least one DCCH and at least one MAC CE and at least one DTCH logical channel with MAC SDU multiplexed in the MAC PDU for SDT;

highest or lowest priority CAPC of all parts which are multiplexed in the MAC PDU for SDT;

highest or lowest priority;

highest or lowest priority CAPC of at least one and at least one MAC CE multiplexed in the MAC PDU for SDT;

highest or lowest priority if CCCH SDU(s) carrying signaling radio bearer (SRB) 0 is included for SDT;

highest or lowest priority CAPC of at least one MAC CE and at least one logical channel with MAC SDU multiplexed in the MAC PDU for SDT; or highest or lowest priority CAPC of at least one MAC CE and at least one DTCH logical channel with MAC SDU multiplexed in the MAC PDU for SDT.

16. The UE of claim 15, wherein the at least one processor is configured to cause the UE to: re-assemble the MAC PDU including only a highest priority CAPC part in a previous MAC PDU if a consistent listen before talk (LBT) failure for SDT is triggered.

17. The UE of claim 11, wherein the at least one processor is configured to cause the UE to select the channel and perform SDT based on the CAPC for SDT during radio resource control (RRC) based SDT or RRC-less SDT.

18. The UE of claim 17, wherein the at least one processor is configured to cause the UE to select, if the rule is not configured for the RRC-less SDT, a same CAPC for SDT with RRC based SDT, by assuming a certain RRC message is included as RRC based SDT.

19. The UE of claim 11, wherein the at least one processor is configured to cause the UE to use a same value of the CAPC for SDT for a RRC-based SDT and for a RRC-less SDT.

20. A method, performed by a base station, comprising:

receiving uplink (UL) small data transmission (SDT) from a user equipment (UE);

selecting a channel access priority class (CAPC) to be used for downlink (DL) SDT based on a rule; and wherein the UL SDT is based on the selected CAPC for uplink (UL) SDT during at least configured grant (CG) based SDT, and wherein receiving the CAPC to be used for SDT based on a rule comprises receiving a highest or lowest priority CAPC of at least one common control channel (CCCH) if the CCCH or at least one dedicated control channel (DCCH) service data unit (SDU) or MAC CE is included for SDT.

\* \* \* \* \*